US012803103B2

(12) United States Patent
Ke et al.

(10) Patent No.: US 12,803,103 B2

(45) Date of Patent: Nov. 17, 2026

(54) PRESSURE RELIEF APPARATUS, BATTERY CELL, BATTERY AND ELECTRIC APPARATUS

(71) Applicant: CONTEMPORARY AMPEREX TECHNOLOGY (HONG KONG) LIMITED, Hong Kong (CN)

(72) Inventors: Haibo Ke, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 639 days.

(21) Appl. No.: 18/169,256

(22) Filed: Feb. 15, 2023

(65) Prior Publication Data

US 2023/0198089 A1 Jun. 22, 2023

Related U.S. Application Data

(63) Continuation of application No. PCT/CN2021/115768, filed on Aug. 31, 2021.

(51) Int. Cl.

*H01M 50/342* (2021.01)
*H01M 50/143* (2021.01)

(52) U.S. Cl.

CPC ..... *H01M 50/3425* (2021.01); *H01M 50/143* (2021.01); *H01M 50/342* (2021.01)

(58) Field of Classification Search

CPC ........... H01M 50/3425; H01M 50/342; H01M 50/143; H01M 50/233; H01M 50/242

See application file for complete search history.

(56) References Cited

U.S. PATENT DOCUMENTS

| | | | |
|---|---|---|---|
| 5,677,076 | A | 10/1997 | Sato et al. |
| 9,065,113 | B2 | 6/2015 | Ahn et al. |

(Continued)

FOREIGN PATENT DOCUMENTS

| | | | |
|---|---|---|---|
| CN | 107004805 | A | 8/2017 |
| CN | 109873094 | A | 6/2019 |

(Continued)

OTHER PUBLICATIONS

Terakoshi, English Machine Translation of JP 2016157570, 2016 (Year: 2016).*

(Continued)

*Primary Examiner* — Katelyn W Smith
*Assistant Examiner* — Brendon Charles Darby
(74) *Attorney, Agent, or Firm* — Ladas & Parry, LLP

(57) ABSTRACT

A pressure relief device, a battery cell, a battery and an electrical device are provided. The pressure relief device has a pressure relief body and a pressure relief structure. The pressure relief structure has a first score groove, a second score groove and a third score groove provided on the pressure relief body. The first score groove and the third score groove are arranged at an interval, the first score groove and the third score groove both intersect with the second score groove, and the first score groove, the second score groove and the third score groove jointly define a pressure relief portion. The pressure relief portion is configured to split with the first score groove, the second score groove and the third score groove as boundaries when the pressure or temperature inside the battery cell reaches a threshold.

15 Claims, 6 Drawing Sheets

(56) References Cited

U.S. PATENT DOCUMENTS

| | | | |
|---|---|---|---|
| 2011/0212350 A1 | 9/2011 | Sato et al. | |
| 2015/0280191 A1 | 10/2015 | Matsudo et al. | |

FOREIGN PATENT DOCUMENTS

| | | | | |
|---|---|---|---|---|
| CN | 212113860 U | | 12/2020 | |
| CN | 213340640 U | | 6/2021 | |
| JP | H10269997 A | | 10/1998 | |
| JP | 2002367583 A | | 12/2002 | |
| JP | 2003346761 A | | 12/2003 | |
| JP | 2010282850 A | | 12/2010 | |
| JP | 5043249 B2 | * | 10/2012 | .......... H01M 50/325 |
| JP | 2013048038 A | | 3/2013 | |
| JP | 2016157570 A | | 9/2016 | |
| KR | 20160067642 A | | 6/2016 | |

OTHER PUBLICATIONS

Nemoto, English Machine Translation of JP 5043249, 2012 (Year: 2012).*

International Search Report for International Application No. PCT/CN2021/115768, dated May 12, 2022.

Written Opinion of International Search Authority for International Application No. PCT/CN2021/115768, dated May 12, 2022.

Notification to Grant Utility Model Patent Right for CN application No. 202122087427.8, dated Jan. 6, 2022.

Request for the Submission of an Opinion, KR application No. 10-2023-7004559, dated Oct. 30, 2024.

Extended European Search Report for EP application No. 21953031.8, dated Jan. 13, 2025.

Partial European search report for EP application No. 21953031.8, dated Oct. 18, 2024.

Decision to Grant a Patent, JP application No. 2023-504586, dated Oct. 15, 2024.

Notice of Reasons for Refusal, JP application No. 2023-504586, dated Feb. 20, 2024.

* cited by examiner

PRESSURE RELIEF APPARATUS, BATTERY CELL, BATTERY AND ELECTRIC APPARATUS

CROSS REFERENCE TO RELATED APPLICATION

This application is a continuation of International Patent Application No. PCT/CN2021/115768, filed on Aug. 31, 2021, which is incorporated herein by reference in its entirety.

TECHNICAL FIELD

The present application relates to the technical field of batteries, and specifically, to a pressure relief device, a battery cell, a battery, and an electrical device.

BACKGROUND

Batteries are widely used in electronic devices, such as mobile phones, laptop computers, battery vehicles, electric vehicles, electric planes, electric ships, electric toy cars, electric toy ships, electric toy planes, and electric tools.

In the development of battery technologies, in addition to improving the performance of the battery cells, safety problem is also a concern that cannot be ignored.

Therefore, how to enhance the safety of the battery cells is an urgent problem to be solved in the battery technologies.

SUMMARY

Embodiments of the present application provides a pressure relief device, a battery cell, a battery, and an electrical device, where the safety of the battery cell is effectively increased.

In a first aspect, an embodiment of the present application provides a pressure relief device for a battery cell, including: a pressure relief body; and a pressure relief structure, including a first score groove, a second score groove, and a third score groove provided on the pressure relief body. The first score groove and the third score groove are arranged at an interval, and the first score groove and the third score groove both intersect with the second score groove. The first score groove, the second score groove and the third score groove jointly define a pressure relief portion. The pressure relief portion is configured to split with the first score groove, the second score groove and the third score groove as boundaries when the pressure or temperature inside a battery cell reaches a threshold, so as to relieve the pressure inside the battery cell.

In the above technical solution, the first score groove and the third score groove in the pressure relief structure are arranged at an interval, the first score groove and the third score groove both intersect with the second score groove, and the first score groove, the second score groove and the third score groove jointly define the pressure relief portion. When the thermal runaway of the battery cell causes the pressure or temperature inside the battery cell to reach a threshold, the pressure relief portion will split with the first score groove, the second score groove and the third score groove as boundaries, so as to achieve the purpose of relieving the pressure inside the battery cell. During the pressure relief process by the pressure relief device, the pressure relief portion splits with the first score groove, the second score groove and the third score groove as boundaries, and the open area of the pressure relief portion is larger. This increases the pressure relief area of the pressure relief device, thereby improving the pressure relief rate of the pressure relief device, reducing the risk of fire and explosion of the battery cell due to thermal runaway, and improving the safety of the battery cell.

In some embodiments, the first score groove, the second score groove and the third score groove jointly define two pressure relief portions, and the two pressure relief portions are divided by the second score groove.

In the above technical solution, the first score groove, the second score groove and the third score groove jointly define two pressure relief portions divided by the second score groove. During the pressure relief process, the two pressure relief portions can be quickly split opposing each other, so as to improve the split efficiency of the pressure relief portion and achieve rapid pressure relief while ensuring sufficient pressure relief area.

In some embodiments, the two pressure relief portions are symmetrically distributed at two sides of the second score groove.

In the above technical solution, the two pressure relief portions are symmetrically distributed at two sides of the second score groove, so that the size and shape of the two pressure relief portions are the same, which is conducive to the simultaneous splitting of the two pressure relief portions. The situation does not tend to occur where one pressure relief portion is split first, and then the other pressure relief portion is split later, or even not split.

In some embodiments, the second score groove has a first weak site, a second weak site and a third weak site. The second score groove intersects with the first score groove at the first weak site, and the second score groove intersects with the third score groove at the third weak site. In the extending direction of the second score groove, the second weak site is located between the first weak site and the third weak site. The pressure relief body is configured to, when the pressure or temperature inside a battery cell reaches a threshold, crack from the second weak site toward the first weak site and the third weak site along the second score groove to form a first crack, so that the pressure relief portion is split along the first score groove and the third score groove after the pressure relief body is formed with the first crack.

In the above technical solution, the second weak site is located between the first weak site and the third weak site, and the second weak site is the starting position of pressure relief. When the pressure or temperature inside the battery cell reaches a threshold, the pressure relief body will crack from the second weak site toward the first weak site and the third weak site at two sides along the second score groove, and then the pressure relief body will be split along the first score groove and the third score groove. Therefore, the pressure relief portion is split along the first and third score grooves after the pressure relief body cracks along the second score groove, so as to realize the rapid splitting of the pressure relief portion and improve the pressure relief efficiency.

In some embodiments, the pressure relief structure further includes a fourth score groove provided on the pressure relief body, and the fourth score groove intersects with the second score groove at the second weak site.

In the above technical solution, the fourth score groove intersects with the second score groove at the second weak site. That is to say, the position where the fourth score groove intersects with the second score groove forms the second weak site. When the second weak site is formed by arranging the fourth score groove on the pressure relief body, the structure is simple, and the manufacturing cost is low. In addition, in an initial stage of pressure relief, the pressure relief body may split along the second and fourth score grooves to create partial pressure relief before the pressure relief portion is fully split.

In some embodiments, the depth of the first score groove, the depth of the second score groove, and the depth of the third score groove are all less than the depth of the fourth score groove.

In the above technical solution, the depth of the first score groove, the depth of the second score groove and the depth of the third score groove are all smaller than the depth of the fourth score groove. That is, among the first score groove, the second score groove, the third score groove and the fourth score groove, the fourth score groove has the highest depth, so that the second weak site formed by the intersection of the fourth score groove and the second score groove is weaker. The pressure relief body is more prone to breakage at the second weak site than at the first weak site and the third weak site. This ensures that during the pressure relief process, the pressure relief body cracks from the second weak site toward the first weak site and the third weak site at two sides along the second score groove.

In some embodiments, the depth of the first score groove and the depth of the third score groove are the same as the depth of the second score groove.

In the above technical solution, the depth of the first score groove, the depth of the second score groove and the depth of the third score groove are the same, which is convenient for the processing and forming of the first score groove, the second score groove and the third score groove. In addition, since the depth of the first score groove is the same as the depth of the third score groove, the consistency of the pressure relief body cracking along the first score groove and the third score groove is ensured, facilitating the rapid splitting of the pressure relief portion.

In some embodiments, the depth of the first score groove and the depth of the third score groove are less than the depth of the second score groove, and the depth of the second score groove is the same as the depth of the fourth score groove.

In the above technical solution, the depth of the fourth score groove is the same as the depth of the second score groove and greater than the depth of the first and third score grooves. Such a structure causes the fact that the second weak site formed by the intersection of the fourth score groove and the second score groove is weaker. The pressure relief body is more prone to breakage at the second weak site than at the first weak site and the third weak site. This ensures that during the pressure relief process, the pressure relief body cracks from the second weak site toward the first weak site and the third weak site at two sides along the second score groove.

In some embodiments, the depth of the first score groove is the same as the depth of the third score groove.

In the above technical solution, since the depth of the first score groove is the same as the depth of the third score groove, the consistency of the pressure relief body cracking along the first score groove and the third score groove is ensured, facilitating the rapid splitting of the pressure relief portion.

In some embodiments, the first score groove has a first end, the third score groove has a second end, and the fourth score groove has a third end. In a width direction of the second score groove, the first end, the second end and the third end are located at the same side of the second score groove. The length from the first end of the first score groove to the first weak site is a first length, the length from the second end of the third score groove to the third weak site is a second length, and the length from the third end of the fourth score groove to the second weak site is a third length, where the third length is smaller than the first length and the second length.

In the above technical solution, the third length is smaller than the first length and the second length, so that even if the pressure relief body cracks along the fourth score groove, a long crack will not be formed. The situation does not tend to occur where the pressure relief body cracks too further along the fourth score groove, causing that the pressure relief body does not crack along the first score groove or the third score groove. This facilitates the splitting of the pressure relief portion along the first score groove and the third score groove.

In some embodiments, the first length is the same as the second length.

In the above technical solution, the first length is the same as the second length, that is, the lengths of the first score groove and the third score groove at the same side of the second score groove are the same, so that the pressure relief portion can be split more regularly.

In some embodiments, the first weak site is located at the midpoint of the first score groove, the second weak site is located at the midpoint of the fourth score groove, and the third weak site is located at the midpoint of the third score groove; and the length of the fourth score groove is smaller than the length of the first score groove and the length of the third score groove.

In the above technical solution, the first weak site, the second weak site and the third weak site are respectively located at the midpoints of the first score groove, the fourth score groove and the third score groove, whereby the pressure relief body is formed with two pressure relief portions at two sides of the second score groove. During the pressure relief process, the two pressure relief portions can be quickly split opposing each other, and the magnitudes of splitting of the two pressure relief portions are basically the same. In addition, the length of the fourth score groove is smaller than the length of the first score groove and the length of the third score groove, which facilitates the splitting of the pressure relief portion along the first score groove and the third score groove.

In some embodiments, the length of the first score groove is the same as the length of the third score groove.

In the above technical solution, the length of the first score groove is the same as the length of the third score groove. This facilitates the complete cracking of the pressure relief body along the first score groove and the third score groove during the process of splitting the pressure relief portion.

In some embodiments, the fourth score groove is arranged to intersect with and be perpendicular to the second score groove.

In the above technical solution, the fourth score groove is arranged to intersect with and be perpendicular to the second score groove, so that the stress at the intersection of the fourth score groove and the second score groove is more concentrated, whereby the pressure relief body is more prone to breakage at the second weak site.

In some embodiments, the wall thickness of the pressure relief body at the first weak site and the wall thickness of the pressure relief body at the third weak site are both greater than the wall thickness of the pressure relief body at the second weak site.

In the above technical solution, the wall thickness of the pressure relief body at the first weak site and the wall thickness at the third weak site are greater than the wall thickness at the second weak site, that is, the wall thickness of the pressure relief body at the second weak site is thinner. As such, the pressure relief body is more prone to breakage at the second weak site than at the first weak site and the third weak site. This ensures that during the pressure relief process, the pressure relief body cracks from the second weak site toward the first weak site and the third weak site at two sides along the second score groove.

In some embodiments, in the extending direction of the second score groove, the second score groove has opposing fourth and fifth ends. The first score groove is closer to the fourth end than the third score groove, and the third score groove is closer to the fifth end than the first score groove. The fourth end is beyond the first score groove in a direction in which the first score groove faces away from the third score groove; and/or the fifth end is beyond the third score groove in a direction in which the third score groove faces away from the first score groove.

In the above technical solution, the fourth end of the second score groove is beyond the first score groove in a direction in which the first score groove faces away from the third score groove, which is beneficial to the formation of the first weak site at the intersection of the first score groove and the second score groove. Therefore, the pressure relief body can easily split along the first score groove with the first weak site as a starting point after splitting along the second score groove. The fifth end of the second score groove is beyond the third score groove in a direction in which the third score groove faces away from the first score groove, which is beneficial to the formation of the third weak site at the intersection of the third score groove and the second score groove. Therefore, the pressure relief body can easily split along the third score groove with the third weak site as a starting point after splitting along the second score groove.

In some embodiments, the pressure relief body is provided with a concave portion, and the pressure relief structure is located at the bottom surface of the concave portion.

In the above technical solution, the pressure relief structure is located at the bottom surface of the concave portion, and the depth of each score groove in the pressure relief structure does not need to be processed too deep, thereby reducing the difficulty of forming each score groove.

In some embodiments, an accommodating cavity for accommodating an electrode assembly is formed inside the pressure relief body. The pressure relief body has a plurality of walls defining the accommodating cavity, and at least one wall is provided with the pressure relief structure.

In the above technical solution, an accommodating cavity for accommodating an electrode assembly is formed inside the pressure relief body, and the pressure relief body has a plurality of walls defining the accommodating cavity. That is, the pressure relief device is a case structure capable of accommodating the electrode assembly, and the pressure relief device has integrated accommodating and pressure relief functions.

In some embodiments, the pressure relief structure is provided on an outer surface of the wall.

In the above technical solution, the pressure relief structure is arranged on the outer surface of the wall to facilitate the processing of various score grooves in the pressure relief structure.

In some embodiments, the wall is provided with a concave portion recessed from the outer surface to the inner surface of the wall, and the pressure relief structure is located at the bottom surface of the concave portion.

In the above technical solution, the pressure relief structure is located at the bottom surface of the concave portion, and the depth of each score groove in the pressure relief structure does not need to be processed too deep, thereby reducing the difficulty of forming each score groove. In addition, since the concave portion is recessed inward from the outer surface of the wall, the concave portion can provide an avoidance space for the pressure relief portion, so that the pressure relief portion is at least partially accommodated in the concave portion after splitting, thus reducing the space outside the outer surface of the wall occupied by the pressure relief portion after splitting.

In a second aspect, an embodiment of the present application provides a battery cell, including a pressure relief device provided in any one of the embodiments according to the first aspect.

In a third aspect, an embodiment of the present application provides a battery, including: a battery cell provided in any one of the embodiments according to the second aspect; and a box body for accommodating the battery cell.

In a fourth aspect, an embodiment of the present application provides an electrical device, including a battery provided in any one of the embodiments according to the third aspect.

In a fifth aspect, an embodiment of the present application provides a method of manufacturing a pressure relief device, including: providing a pressure relief body; and machining a pressure relief structure on the pressure relief body, where the pressure relief structure includes a first score groove, a second score groove, and a third score groove provided on the pressure relief body. The first score groove and the third score groove are arranged at an interval, and the first score groove and the third score groove both intersect with the second score groove. The first score groove, the second score groove and the third score groove jointly define a pressure relief portion. The pressure relief portion is configured to split with the first score groove, the second score groove and the third score groove as boundaries when the pressure or temperature inside a battery cell reaches a threshold, so as to relieve the pressure inside the battery cell.

In a sixth aspect, an embodiment of the present application provides an apparatus for manufacturing a pressure relief device, including: a providing means, configured to provide a pressure relief body; and a machining means, configured to machine a pressure relief structure on the pressure relief body, where the pressure relief structure includes a first score groove, a second score groove, and a third score groove provided on the pressure relief body. The first score groove and the third score groove are arranged at an interval, and the first score groove and the third score groove both intersect with the second score groove. The first score groove, the second score groove and the third score groove jointly define a pressure relief portion. The pressure relief portion is configured to split with the first score groove, the second score groove and the third score groove as boundaries when the pressure or temperature inside a battery cell reaches a threshold, so as to relieve the pressure inside the battery cell.

BRIEF DESCRIPTION OF DRAWINGS

To describe the technical solutions in embodiments of the present application more clearly, the drawings to be used in the embodiments will be briefly described below. It should be understood that these drawings merely show some of the embodiments of the present application, and should not be regarded as limiting the scope of the present application. For those of ordinary skills in the art, other drawings may also be obtained based on these drawings without creative efforts.

REFERENCE NUMERALS

Figure 1:
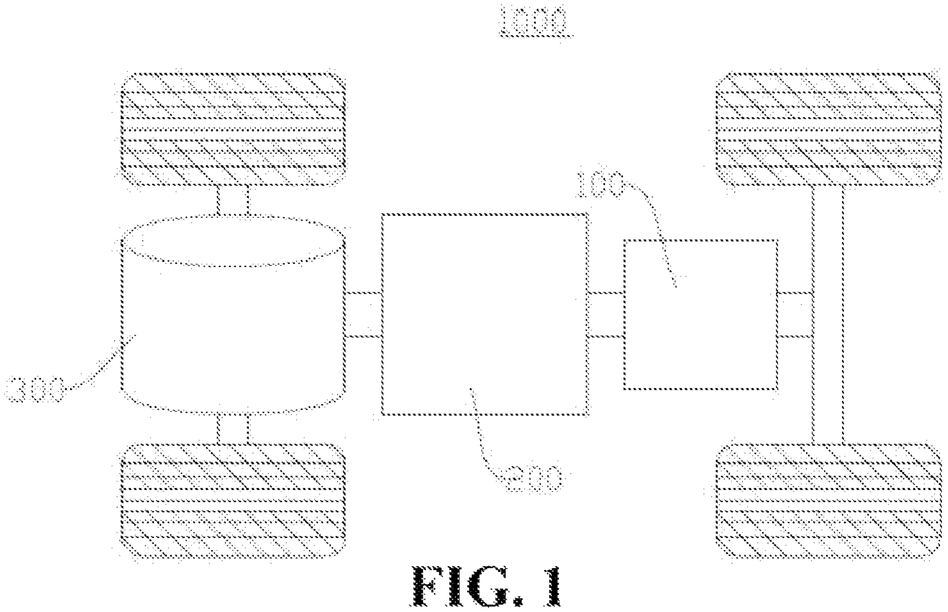
FIG. 1 is a schematic structural view of a vehicle provided in some embodiments of the present application.

10—box body;
11—first portion;
12—second portion;
20—battery cell;
21—case;
22—electrode assembly;
221—positive electrode tab;
222—negative electrode tab;
23—end cap;
231—positive electrode terminal;
232—negative electrode terminal;
24—insulating member;
25—pressure relief device;
251—pressure relief body;
2511—concave portion;
252—pressure relief structure;
2521—first score groove;
**2521*a***—first end;
2522—second score groove;
**2522*a***—fourth end;
**2522*b***—fifth end;
2523—third score groove;
**2523*a***—second end;
2524—pressure relief portion;
2525—first weak site;
2526—second weak site;
2527—third weak site;
2528—fourth score groove;
**2528*a***—third end;
26—current collecting member;
100—battery;
200—controller;
300—motor;
1000—vehicle;
2000—manufacturing apparatus;
2100—providing means;
2200—machining means.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. Based on the examples in the present application, all other examples obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific examples, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

Reference herein to "an embodiment" means that a particular feature, structure, or characteristic described in connection with the embodiment can be included in at least one embodiment of the present application. The appearance of this phrase in various places in the specification does not necessarily refer to the same example, nor is it a separate or alternative example that is mutually exclusive with other examples.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the examples of the present application, the same reference numerals denote the same components, and for the sake of brevity, detailed descriptions of the same components are omitted in different examples. It should be understood that the thickness, length, width and other dimensions of various components in the examples of the present application shown in the drawings, as well as the overall thickness, length and width, etc. of the integrated device are only exemplary descriptions, and should not constitute any limitation to the present application.

The "plurality" in the present application refers to two or more (including two).

In the present application, battery cells may include a lithium-ion secondary battery, a lithium-ion primary battery, a lithium-sulfur battery, a sodium-lithium-ion battery, a sodium-ion battery, or a magnesium-ion battery, etc., which is not limited in the examples of the present application. The battery cell may be cylindrical, flat, rectangular, or in other shapes, which is also not limited in the embodiments of the present application. The battery cells are generally divided into three types according to the packaging manners: cylindrical battery cells, rectangular battery cells, and pouch battery cells, which are not limited in the embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery typically includes a box body for encapsulating one or more battery cells. The box body can prevent liquids or other foreign matters from affecting charging or discharging of the battery cells.

The battery cells include electrode assemblies and electrolyte solutions, and each electrode assembly is composed of a positive electrode sheet, a negative electrode sheet and a separator. The battery cells work mainly relying on the movement of metal ions between the positive electrode sheet and the negative electrode sheet. The positive electrode sheet includes a positive current collector and a positive electrode active material layer, a surface of the positive current collector is coated with the positive electrode active material layer, the positive current collector not coated with the positive electrode active material layer protrudes from the positive electrode collector already coated with the positive electrode active material layer, and the positive current collector not coated with the positive electrode active material layer is used as a positive electrode tab. Taking a lithium-ion battery as an example, the material of the positive current collector may be aluminum, and the positive electrode active material may be lithium cobalt oxide, lithium iron phosphate, ternary lithium, lithium manganate, or the like. The negative electrode sheet includes a negative current collector and a negative electrode active material layer, a surface of the negative current collector is coated with the negative electrode active material layer, the negative current collector not coated with the negative electrode active material layer protrudes from the negative electrode collector already coated with the negative electrode active material layer, and the negative current collector not coated with the negative electrode active material layer is used as a negative electrode tab. The material of the negative electrode current collector may be copper, and the negative electrode active material may be carbon, silicon, or the like. In order to ensure that no fusing occurs when a large current passes, there are a plurality of positive electrode tabs which are laminated together, and there are a plurality of negative electrode tabs which are laminated together. A separator may be made from polypropylene (PP), polyethylene (PE), or the like. In addition, the electrode assembly may be of a wound structure or a laminated structure, which is not limited in the embodiments of the present application.

Many design factors, such as energy density, cycle life, discharge capacity, charge-discharge rate and other performance parameters, should be considered in the development of the battery technology. In addition, the safety performance of the battery also needs to be taken into account.

To ensure the safety of a battery cell, a pressure relief device is generally provided in the battery cell, and the pressure inside the battery cell is relieved through the pressure relief device to ensure the safety of the battery cell.

The present inventors find that even if a pressure relief device is provided in the battery cell, the risk of fire and explosion of the battery cell still occurs. The present inventors find after further research that the current pressure relief device is generally provided with a score groove on a pressure relief body. When the pressure is relieved, the pressure relief body is split from the position of the score groove to discharge the emissions from the position of the score groove, and achieve the purpose of pressure relief. The pressure relief device is generally a "—"-shaped score groove, the pressure relief area is small, and the pressure relief efficiency is low. As a result, the internal emissions inside the battery cell cannot be discharged in time when thermal runaway of the battery cell occurs, causing safety problems such as fire and explosion.

In view of this, an embodiment of the present application provides a pressure relief device. A first score groove, a second score groove, and a third score groove are provided on a pressure relief body. The first score groove and the third score groove are arranged at an interval, and the first score groove and the third score groove both intersect with the second score groove. The first score groove, the second score groove and the third score groove jointly define a pressure relief portion. The pressure relief portion is configured to split with the first score groove, the second score groove and the third score groove as boundaries when the pressure or temperature inside a battery cell reaches a threshold, so as to relieve the pressure inside the battery cell.

In such a pressure relief device, the pressure relief portion splits with the first score groove, the second score groove and the third score groove as boundaries, and the open area of the pressure relief portion is larger. This increases the pressure relief area of the pressure relief device, thereby improving the pressure relief rate of the pressure relief device, reducing the risk of fire and explosion of the battery cell due to thermal runaway, and improving the safety of the battery cell.

The pressure relief device described in the embodiments of the present application is suitable for used with battery cells, batteries, and electrical device using batteries.

The electrical device may be a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an range extended electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not impose special limitations on the above electrical device.

In the following embodiments, for the convenience of description, are described by way of examples in which the electrical device is a vehicle.

Referring to FIG. 1, which is a schematic structural view of a vehicle 1000 according to some embodiments of the present application. The vehicle 1000 is provided with a battery 100 therein, which can be provided at the bottom, the head, or the tail of the vehicle 1000. The battery 100 can be used to power the vehicle 1000, for example, the battery 100 can serve as an operating power source for the vehicle 1000.

The vehicle 1000 may further include a controller 200 and a motor 300, where the controller 200 is used to control the battery 100 to power the motor 300, for example, to meet the operating power demand when the vehicle 1000 is starting, navigating and driving.

In some embodiments of the present application, the battery 100 can not only serve as an operating power source of the vehicle 1000, but also serve as a driving power source of the vehicle 1000, to replace or partially replace the fuel or natural gas to provide driving power for the vehicle 1000.

Figure 2:
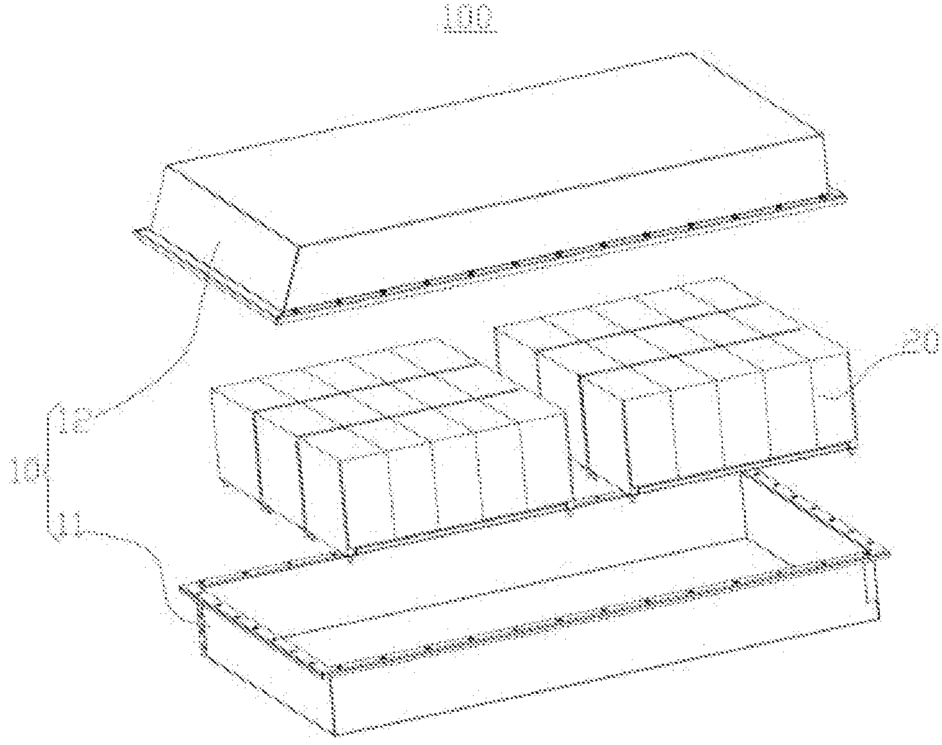
FIG. 2 is a schematic structural view of a battery provided in some embodiments of the present application.

Referring to FIG. 2, which is a schematic structural view of a battery 100 according to some embodiments of the present application. The battery 100 includes a box body 10 and a battery cell 20, where the box body 10 is used to accommodate the battery cell 20.

Here, the box body 10 is a component used to accommodate the battery cell 20, the box body 10 provides an accommodating space for the battery cell 20, and the box body 10 can be of various structures. In some embodiments, the box body 10 may include a first portion 11 and a second portion 12, where the first portion 11 and the second portion 12 are fitted to each other to define an accommodating space for accommodating the battery cell 20. The first portion 11 and the second portion 12 may be of various shapes, such as a cuboid, and a cylinder, etc. The first portion 11 may be a hollow structure with one open side, and the second portion 12 may also be a hollow structure with one open side. The open side of the second portion 12 is fitted to the open side of the first portion 11 to form the box body 10 with an accommodating space. Alternatively, the first portion 11 is a hollow structure with one open side, and the second portion 12 has a plate-like structure. The second portion 12 is fitted to the open side of the first portion 11 to form the box body 10 with an accommodating space. The first portion 11 and the second portion 12 can be sealed by a sealing element that may be a sealing ring, a sealant or the like.

In the battery 100, one or more battery cells 20 may be provided. If a plurality of battery cells 20 are provided, the plurality of battery cells 20 can be connected in series, in parallel or in a hybrid pattern, where the hybrid pattern means that the plurality of battery cells 20 are connected in both series and parallel. The plurality of battery cells 20 may be connected in series, in parallel or in a hybrid pattern into a battery module, and then a plurality of battery modules are connected in series, in parallel or in a hybrid pattern into one piece and accommodated into the box body 10. Alternatively, all the battery cells 20 may be directly connected in series, in parallel or in a hybrid pattern into one piece, and the one piece of all the battery cells 20 is accommodated in the box body 10.

In some embodiments, the battery 100 may further include a bus component, and the plurality of battery cells 20 are electrically connected through the bus component, so as to connect the plurality of battery cells 20 in series, in parallel or in a hybrid pattern. The bus component may be a metal conductor such as copper, iron, aluminum, stainless steel, aluminum alloys, and the like.

Figure 3:
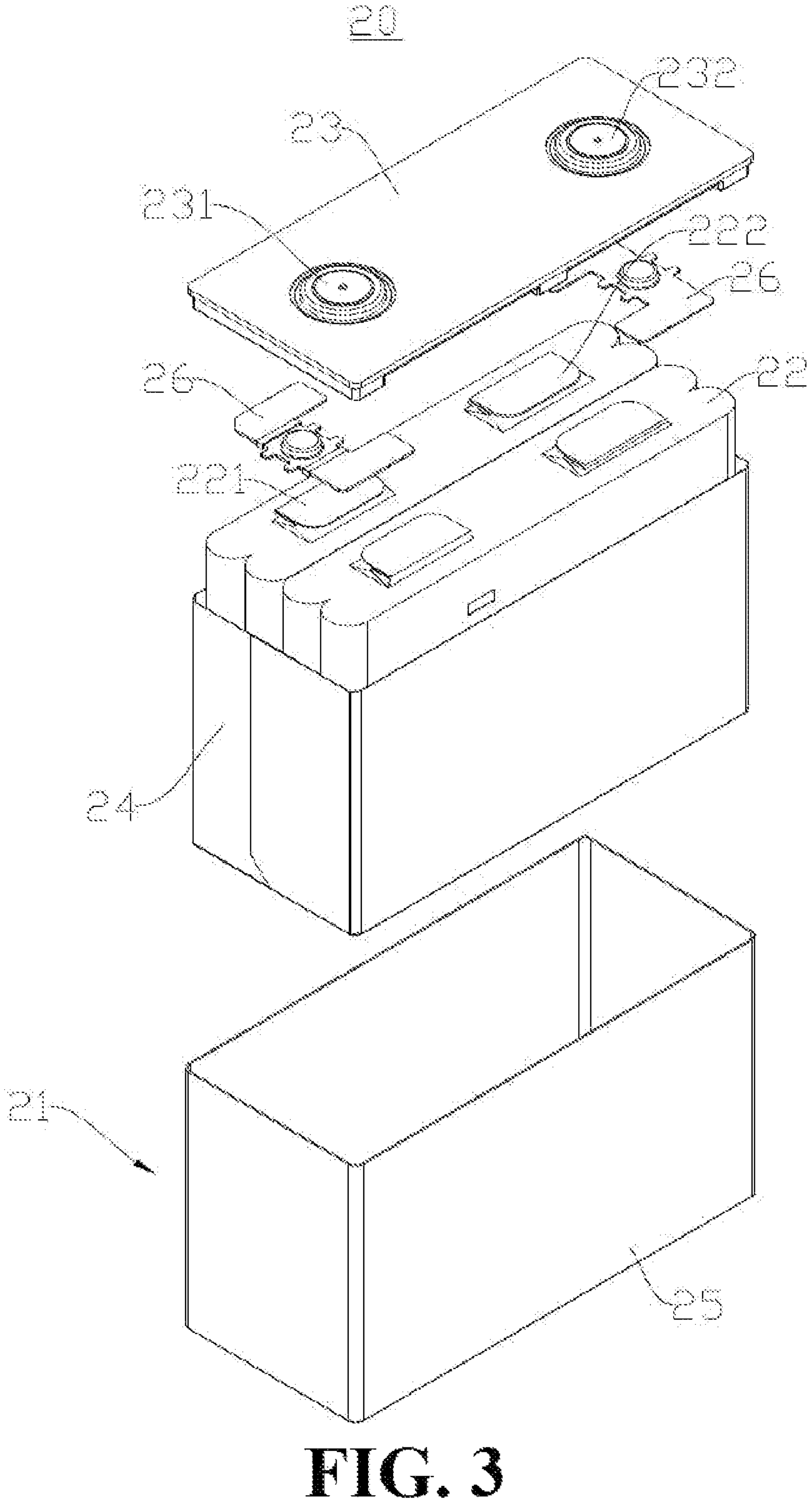
FIG. 3 is an exploded view of a battery cell provided in some embodiments of the present application.

Referring to FIG. 3, which is an exploded view of a battery cell 20 according to some embodiments of the present application. The battery cell 20 includes a case 21, an electrode assembly 22, an end cap 23, an insulating member 24 and a pressure relief device 25.

The case 21 is a component for accommodating the electrode assembly 22, and the case 21 may be a hollow structure with an opening formed at one end. The case 21 may be in various shapes, such as a cylinder, a cuboid, or the like. The case 21 may be made of various materials, such as copper, iron, aluminum, steel, and aluminum alloy.

One or more electrode assemblies 22 may be accommodated in the case 21. For example, as shown in FIG. 3, a plurality of electrode assemblies 22 are provided, and the plurality of electrode assemblies 22 are laminated.

The electrode assembly 22 is a component in the battery cell 20 in which the electrochemical reaction occurs. The electrode assembly 22 includes a positive electrode sheet, a negative electrode sheet, and a separator. The electrode assembly 22 may be a wound structure formed by winding the positive electrode sheet, the separator and the negative electrode sheet, or a laminated structure formed by a laminated arrangement of the positive electrode sheet, the separator and the negative electrode sheet.

The positive electrode sheet may include a positive electrode current collector and a positive electrode active material layer coated on two opposing sides of the positive electrode current collector. The negative electrode sheet may include a negative electrode current collector and a negative electrode active material layer coated on two opposing sides of the negative electrode current collector. The electrode assembly 22 has a positive electrode tab 221 and a negative electrode tab 222. The positive electrode tab 221 can be a portion of the positive electrode sheet that is not coated with the positive electrode active material layer, and the negative electrode tab 222 can be a portion of the negative electrode sheet that is not coated with the negative electrode active material layer.

The end cap 23 is a component that fits to the opening of the case 21 to isolate an internal environment of the battery cell 20 from the external environment. The end cap 23 is fitted to the opening of the case 21, and the end cap 23 and the case 21 jointly define a sealed space for accommodating the electrode assembly 22, an electrolyte solution and other components. The shape of the end cap 23 mates the shape of the case 21. For example, if the case 21 has a rectangular parallelepiped structure, the end cap 23 has a rectangular plate-shaped structure mating the case 21. For another example, if the case 21 has a cylindrical structure, the end cap 23 has a circular plate-shaped structure mating the case 21. The end cap 23 can also be made of various materials, for example, copper, iron, aluminum, steel, and aluminum alloy, etc. The material of the end cap 23 may be the same as or different from the material of the case 21.

An electrode terminal may be provided on the end cap 23, and the electrode terminal is electrically connected to the electrode assembly 22 to output the electric energy of the battery cell 20. The electrode terminal may include a positive electrode terminal 231 and a negative electrode terminal 232, where the positive electrode terminal 231 is electrically connected to the positive tab 221 and the negative electrode terminal 232 is electrically connected to the negative tab 222. The positive electrode terminal 231 may be directly or indirectly connected to the positive electrode tab 221, and the negative electrode terminal 232 may be directly or indirectly connected to the negative electrode tab 222. Exemplarily, the positive electrode terminal 231 is electrically connected to the positive electrode tab 221 through one current collecting member 26, and the negative electrode terminal 232 is electrically connected to the negative electrode tab 222 through another current collecting member 26.

The insulating member 24 is a component that separates the case 21 from the electrode assembly 22, and the case 21 and the electrode assembly 22 are insulated and isolated by the insulating member 24. The insulating member 24 is formed of an insulating material, and the insulating member 24 is formed of an insulating material such as plastic or rubber. Exemplarily, the insulating member 24 is circumferentially wrapped around the outer circumference of the electrode assembly 22. It is to be understood that in the case of multiple electrode assemblies 22, the insulating member 24 is circumferentially wrapped around the entire outer circumference of the multiple electrode assemblies 22.

The pressure relief device 25 is a component for relieving the pressure inside the battery cell 20. When the pressure or temperature inside the battery cell 20 reaches a threshold, the pressure inside the battery cell 20 is relieved by the pressure relief device 25. The specific structure of the pressure relief device 25 will be described in detail below with reference to the accompanying drawings.

Figure 4:
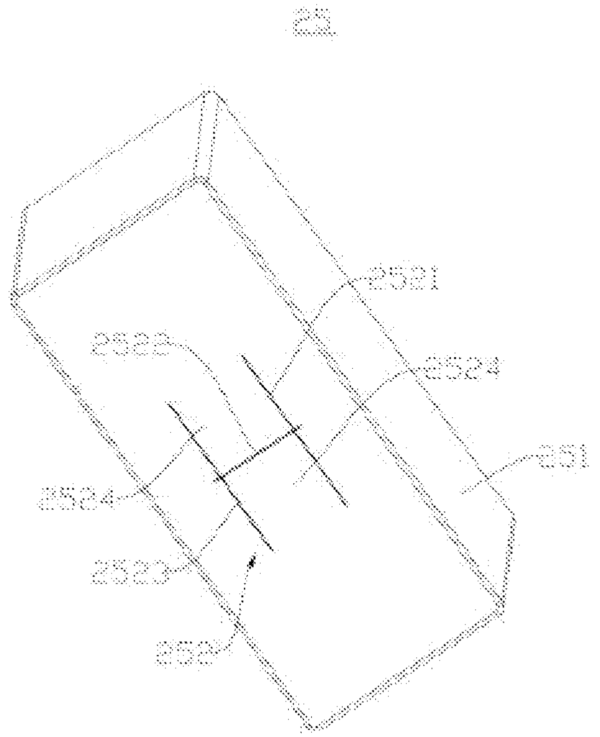
FIG. 4 is a schematic structural view of a pressure relief device provided in some embodiments of the present application.

Referring to FIG. 4, which is a schematic structural view of a pressure relief device 25 provided in some embodiments of the present application. The pressure relief device 25 is used with the battery cell 20, and the pressure relief device 25 includes a pressure relief body 251 and a pressure relief structure 252. The pressure relief structure 252 includes a first score groove 2521, a second score groove 2522 and a third score groove 2523 provided on the pressure relief body 251. The first score groove 2521 and the third score groove 2523 are arranged at an interval, and the first score groove 2521 and the third score groove 2523 both intersect with the second score groove 2522. The first score groove 2521, the second score groove 2522 and the third score groove 2523 jointly define the pressure relief portion 2524. The pressure relief portion 2524 is configured to split with the first score groove 2521, the second score groove 2522 and the third score groove 2523 as boundaries when the pressure or temperature inside the battery cell 20 reaches a threshold, so as to relieve the pressure inside the battery cell 20.

The pressure relief body 251 may be a component mounted on the end cap 23. For example, the pressure relief body 251 is a plate-like structure mounted on the end cap 23. Specifically, the pressure relief body 251 may be an anti-exploding disc mounted on the end cap 23. The pressure relief body 251 may also be the case 21 for accommodating the electrode assembly 22. Exemplarily, in FIG. 4, the housing 21 is the pressure relief body 251, and each score groove in the pressure relief structure 252 (such as the first score groove 2521, the second score groove 2522, and the third score groove 2523) can be directly machined on the case 21.

The first score groove 2521, the second score groove 2522 and the third score groove 2523 may be formed in various ways, such as punching, and milling, etc., which are not particularly limited in the embodiment of the present application. The first score groove 2521, the second score groove 2522 and the third score groove 2523 may be a linear groove extending linearly, and the first score groove 2521, the second score groove 2522 and the third score groove 2523 may also be a non-linear groove, such as an arc-shaped groove. If the first score groove 2521, the second score groove 2522 and the third score groove 2523 are a linear groove extending linearly, the first score groove 2521 may or may not be arranged in parallel with the third score groove 2523; the first score groove 2521 may or may not be arranged to be perpendicular to the second score groove 2522; and the third score groove 2523 may or may not be arranged to be perpendicular to the second score groove 2522. The first score groove 2521, the second score groove 2522 and the third score groove 2523 may all be a V-shaped groove with a V-shaped cross section.

The pressure relief portion 2524 is an area of the pressure relief body 251 that is jointly defined by the first score groove 2521, the second score groove 2522 and the third score groove 2523. It can also be understood that the three sides of the pressure relief portion 2524 are respectively located at a position corresponding to the first score groove 2521, the second score groove 2522 and the third score groove 2523. When the pressure or temperature inside the battery cell 20 reaches a threshold, the pressure relief portion 2524 will split with the first score groove 2521, the second score groove 2522 and the third score groove 2523 as boundaries. That is, the pressure relief body 251 will crack at the positions of the first score groove 2521, the second score groove 2522 and the third score groove 2523 to realize the splitting of the pressure relief portion 2524. The pressure relief body 251 can split completely or partially at the positions of the second score groove 2522 and the third score groove 2523. After the pressure relief portion 2524 is split, the pressure relief body 251 is formed with an opening at a position corresponding to the pressure relief portion 2524, and the emissions (gas, and electrolyte solution, etc.) inside the battery cell 20 can be discharged through the opening to achieve the purpose of relieving the pressure inside the battery cell 20. During the splitting process of the pressure relief portion 2524, the pressure relief portion 2524 may be split by flipping over along a flow direction of the emissions inside the battery cell 20.

It should be noted that there may be one or two pressure relief portions 2524 jointly defined by the first score groove 2521, the second score groove 2522 and the third score groove 2523. For example, the second score groove 2522 is provided at one end of the first score groove 2521 and the third score groove 2523. The first score groove 2521, the second score groove 2522 and the third score groove 2523 form an approximately "right open box"-shaped structure. The first score groove 2521, the second score groove 2522 and the third score groove 2523 define one pressure relief portion 2524. For another example, the second score groove 2522 is provided at a middle position of the first score groove 2521 and the third score groove 2523. The first score groove 2521, the second score groove 2522 and the third score groove 2523 form an approximately "H"-shaped structure. The first score groove 2521, the second score groove 2522 and the third score groove 2523 define two pressure relief portions 2524.

In the pressure relief device 25, since the first score groove 2521 and the third score groove 2523 in the pressure relief structure 252 are arranged at an interval, the first score groove 2521 and the third score groove 2523 both intersect with the second score groove 2522, and the first score groove 2521, the second score groove 2522 and the third score groove 2523 jointly define the pressure relief portion 2524. When the thermal runaway of the battery cell 20 causes the pressure or temperature inside the battery cell 20 to reach a threshold, the pressure relief portion 2524 will split with the first score groove 2521, the second score groove 2522 and the third score groove 2523 as boundaries, so as to achieve the purpose of relieving the pressure inside the battery cell 20. During the pressure relief process by the pressure relief device 25, the pressure relief portion 2524 splits with the first score groove 2521, the second score groove 2522 and the third score groove 2523 as boundaries, and the open area of the pressure relief portion 2524 is larger. This increases the pressure relief area of the pressure relief device 25, thereby improving the pressure relief rate of the pressure relief device 25, reducing the risk of fire and explosion of the battery cell 20 due to thermal runaway, and improving the safety of the battery cell 20.

Figure 5:
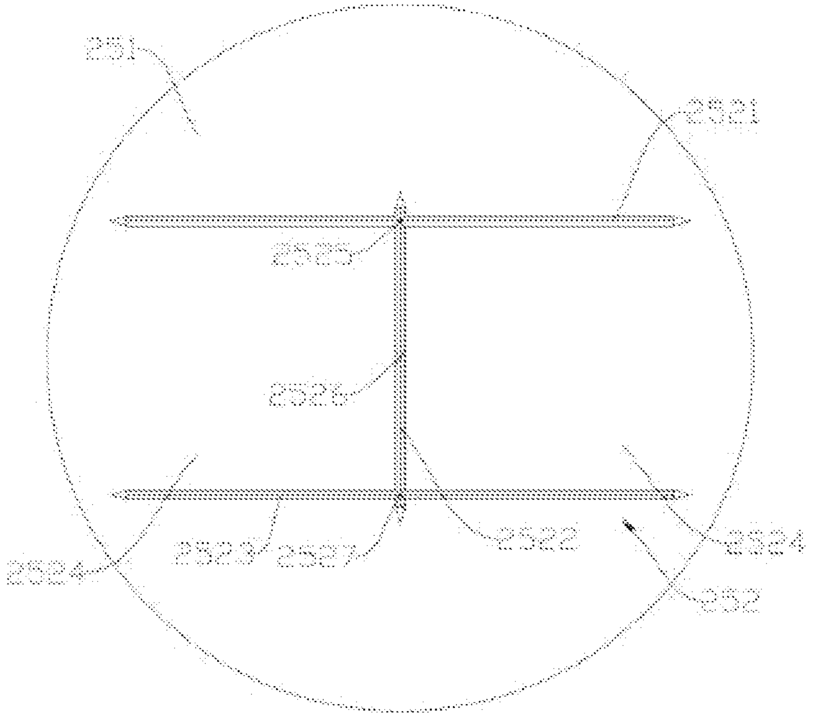
FIG. 5 is a schematic partial view of the pressure relief device shown in FIG. 4.

In some embodiments, referring to FIG. 5, which is a schematic partial view of the pressure relief device 25 shown in FIG. 4. The first score groove 2521, the second score groove 2522 and the third score groove 2523 jointly define two pressure relief portions 2524, and the two pressure relief portions 2524 are divided by the second score groove 2522.

The first score groove 2521, the second score groove 2522 and the third score groove 2523 may form an approximately "H"-shaped structure. The sizes of the two pressure relief portions 2524 may be the same or different.

Since the first score groove 2521, the second score groove and 2522 the third score groove 2523 jointly define two pressure relief portions 2524 divided by the second score groove 2522, during the pressure relief process, the two pressure relief portions 2524 can be quickly split opposing each other, so as to improve the split efficiency of the pressure relief portion 2524 and achieve rapid pressure relief while ensuring sufficient pressure relief area.

In some embodiments, the two pressure relief portions 2524 are symmetrically distributed at two sides of the second score groove 2522.

The second score groove 2522 can be regarded as an axis of symmetry of the two pressure relief portions 2524, and the two pressure relief portions 2524 are symmetrical with respect to the second score groove 2522.

Because the two pressure relief portions 2524 are symmetrically distributed at two sides of the second score groove 2522, so that the size and shape of the two pressure relief portions 2524 are the same, which is conducive to the simultaneous splitting of the two pressure relief portions 2524. The situation does not tend to occur where one pressure relief portion 2524 is split first, and then the other pressure relief portion 2524 is split later, or even not split.

In some embodiments, referring to FIG. 5, the second score groove 2522 has a first weak site 2525, a second weak site 2526 and a third weak site 2527. The second score groove 2522 intersects with the first score groove 2521 at the first weak site 2525, and the second score groove 2522 intersects with the third score groove 2523 at the third weak site 2527. In the extending direction of the second score groove 2522, the second weak site 2526 is located between the first weak site 2525 and the third weak site 2527. The pressure relief body 251 is configured to, when the pressure or temperature inside the battery cell 20 reaches a threshold, crack from the second weak site 2526 toward the first weak site 2525 and the third weak site 2527 along the second score groove 2522 to form a first crack, so that the pressure relief portion 2524 is split along the first score groove 2521 and the third score groove 2523 after the pressure relief body 251 is formed with the first crack.

The first weak site 2525, the second weak site 2526 and the third weak site 2527 are the three weak sites of the third score groove 2523. The first weak site 2525 is a site where the pressure relief body 251 is initially broken at the first score groove 2521. The second weak site 2526 is a site where the pressure relief body 251 is initially broken at the second score groove 2522. The third weak site 2527 is a site where the pressure relief body 251 is initially broken at the third score groove 2523. The pressure relief body 251 is configured to, when the pressure or temperature inside the battery cell 20 reaches a threshold, crack from the second weak site 2526 toward the first weak site 2525 and the third weak site 2527 along the second score groove 2522 to form a first crack. It can be understood that the second weak site 2526 is weaker than the first weak site 2525 and the third weak site 2527. That is, the pressure relief body 251 is more prone to breakage at the second weak site 2526 than at the first weak site 2525 and the third weak site 2527. During the pressure relief process, the second weak site 2526 is broken first, causing the pressure relief body 251 to split from the second weak site 2526 toward the first weak site 2525 and the third weak site 2527 to form the first crack.

The second score groove 2522 intersects with the first score groove 2521 at the first weak site 2525, the position where the second score groove 2522 intersects with the first score groove 2521 is the first weak site 2525, and the second score groove 2522 and the first score groove 2521 intersect to form the first weak site 2525. The second score groove 2522 intersects with the third score groove 2523 at the third weak site 2527, the position where the second score groove 2522 intersects with the third score groove 2523 is the third weak site 2527, and the second score groove 2522 and the third score groove 2523 intersect to form the third weak site 2527. During the forming process, after the first score groove 2521, the second score groove 2522 and the third score groove 2523 are machined on the pressure relief body 251, the first weak site 2525 is formed at the position where the first score groove 2521 intersects with the second score groove 2522, and the third weak site 2527 is formed at the position where the third score groove 2523 intersects with the second score groove 2522.

The distance from the second weak site 2526 to the first weak site 2525 and the distance from the second weak site 2526 to the third weak site 2527 may be the same or different. The second weak site 2526 can be formed in various ways. For example, the second score groove 2522 is a gradient groove with varying depth, and the depth of the second score groove 2522 gradually decreases from the position of the second weak site 2526 toward both ends. The second weak site 2526 is formed at the deepest position of the second score groove 2522. For another example, another score groove is provided on the pressure relief body 251, and the score groove intersects with the second score groove 2522 to form the second weak site 2526.

In this embodiment, the second weak site 2526 is located between the first weak site 2525 and the third weak site 2527, and the second weak site 2526 is a starting position of pressure relief. When the pressure or temperature inside the battery cell 20 reaches a threshold, the pressure relief body 251 will crack from the second weak site 2526 toward the first weak site 2525 and the third weak site 2527 at two sides along the second score groove 2522, and then the pressure relief body 251 will be split along the first score groove 2521 and the third score groove 2523. Therefore, the pressure relief portion 2524 is split along the first score groove 2521 and third score groove 2523 after the pressure relief body 251 cracks along the second score groove 2522, so as to realize the rapid splitting of the pressure relief portion 2524 and improve the pressure relief efficiency.

Figure 6:
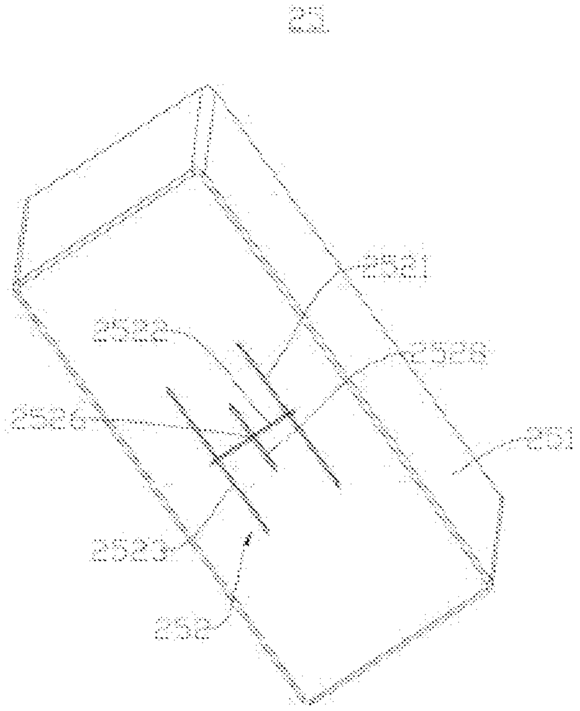
FIG. 6 is a schematic structural view of a pressure relief device provided in some embodiments of the present application.
Figure 7:
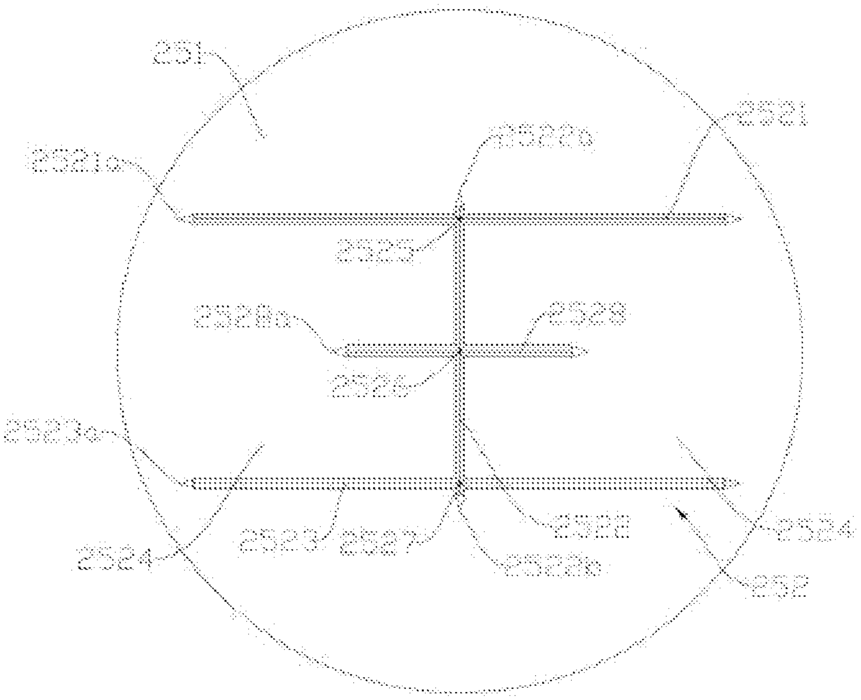
FIG. 7 is a schematic partial view of the pressure relief device shown in FIG. 6.

In some embodiments, referring to FIG. 6 and FIG. 7, FIG. 6 is a schematic structural view of a pressure relief device 25 provided in some embodiments of the present application. FIG. 7 is a schematic partial view of the pressure relief device 25 shown in FIG. 6. The pressure relief structure 252 further includes a fourth score groove 2528 provided on the pressure relief body 251, and the fourth score groove 2528 intersects with the second score groove 2522 at the second weak site 2526.

The fourth score groove 2528 intersects with the second score groove 2522, where one end of the fourth score groove 2528 may be connected to the second score groove 2522, for example, the fourth score groove 2528 and the second score groove 2522 form an approximately "T"-shaped structure; the fourth score groove 2528 and the second score groove 2522 are arranged to cross each other, for example, the fourth score groove 2528 and the second score groove 2522 form a "cross"-shaped structure.

The fourth score groove 2528 intersects with the second score groove 2522 at the second weak site 2526, the position where the fourth score groove 2528 intersects with the second score groove 2522 is the second weak site 2526, and the fourth score groove 2528 and the second score groove 2522 intersect to form the second weak site 2526. During the forming process, after the fourth score groove 2528 and the second score groove 2522 are machined on the pressure relief body 251, the second weak site 2526 is formed at the intersection of the fourth score groove 2528 and the second score groove 2522.

The fourth score groove 2528 may be a linear groove extending in a straight line. The fourth score groove 2528 is located between the first score groove 2521 and the third score groove 2523. The fourth score groove 2528 and the first score groove 2521 may or may not be arranged in parallel, and the fourth score groove 2528 and the third score groove 2523 may or may not be arranged in parallel.

The fourth score groove 2528 can be formed in various ways, such as punching, milling, and the like. The fourth score groove 2528 may be a V-shaped groove with a V-shaped cross-section.

In this embodiment, the second weak site 2526 is formed by arranging the fourth score groove 2528 on the pressure relief body 251. The structure is simple and the manufacturing cost is low. In addition, in a initial stage of pressure relief, the pressure relief body 251 may split along the second score groove 2522 and the fourth score groove 2528 to create partial pressure relief before the pressure relief portion 2524 is fully split.

In some embodiments, the depth of the first score groove 2521, the depth of second score groove 2522, and the depth of the third score groove 2523 are all less than depth of the fourth score groove 2528.

Among the first score groove 2521, the second score groove 2522, the third score groove 2523 and the fourth score groove 2528, the depth of the fourth score groove 2528 is the deepest, and the pressure relief body 251 has the smallest wall thickness at the position of the fourth score groove 2528, so that the pressure relief body 251 is more prone to breakage at the second weak site 2526 at the intersection of the fourth score groove 2528 and the second score groove 2522.

Since the depth of the first score groove 2521, the depth of the second score groove 2522 and the depth of the third score groove 2523 are all smaller than the depth of the fourth score groove 2528, the second weak site 2526 formed by the intersection of the fourth score groove 2528 and the second score groove 2522 is weaker. The pressure relief body 251 is more prone to breakage at the second weak site 2526 than at the first weak site 2525 and the third weak site 2527. This ensures that during the pressure relief process, the pressure relief body 251 cracks from the second weak site 2526 toward the first weak site 2525 and the third weak site 2527 at two sides along the second score groove 2522.

Exemplarily, the depth of the first score groove 2521 and the depth of the third score groove 2523 are both the same as the depth of the second score groove 2522.

The depth of the first score groove 2521, the depth of the second score groove 2522 and the depth of the third score groove 2523 are the same, which is convenient for the processing and forming of the first score groove 2521, the second score groove 2522 and the third score groove 2523. In addition, since the depth of the first score groove 2521 is the same as the depth of the third score groove 2523, the wall thickness of the pressure relief body 251 at the position of the first score groove 2521 is substantially the same as the wall thickness at the position of the third score groove 2523, ensuring the consistency of the pressure relief body 251 splitting along the first score groove 2521 and the third score groove 2523, and facilitating the rapid splitting of the pressure relief portion 2524.

In some other embodiments, the depth of the first score groove 2521 and the depth of the third score groove 2523 are less than the depth of the second score groove 2522, and the depth of the second score groove 2522 is the same as the depth of fourth score groove 2528.

The depth of the third score groove 2523 is the same as the depth of the fourth score groove 2528, and the depth of the first score groove 2521 and the depth of the third score groove 2523 are both smaller than the depth of the second score groove 2522. It can be understood that the depth of the first score groove 2521 and the depth of the third score groove 2523 are also smaller than the depth of the fourth score groove 2528.

The depth of the fourth score groove 2528 is the same as the depth of the second score groove 2522 and greater than the depth of the first score groove 2521 and third score groove 2523. Such a structure causes the fact that the second weak site 2526 formed by the intersection of the fourth score groove 2528 and the second score groove 2522 is weaker than the first weak site 2525 and the third weaker site 2527. The pressure relief body 251 is more prone to breakage at the second weak site 2526 than at the first weak site 2525 and the third weak site 2527. This ensures that during the pressure relief process, the pressure relief body 251 cracks from the second weak site 2526 toward the first weak site 2525 and the third weak site 2527 at two sides along the second score groove 2522.

Exemplarily, the depth of the first score groove 2521 is the same as the depth of the third score groove 2523. This is convenient for the machining and forming of the first score groove 2521 and the third score groove 2523, and ensures that the pressure relief body 251 is split uniformly along the first score groove 2521 and the third score groove 2523, facilitating the quick splitting of the pressure relief portion 2524.

In some embodiments, referring to FIG. 7, the first score groove 2521 has a first end 2521*a*, the third score groove 2523 has a second end 2523*a*, and the fourth score groove 2528 has a third end 2528*a*. In a width direction of the second score groove 2522, the first end 2521*a*, the second end 2523*a* and the third end 2528*a* are located at the same side of the second score groove 2522. The length from the first end 2521*a* of the first score groove 2521 to the first weak site 2525 is a first length, the length from the second end 2523*a* of the third score groove 2523 to the third weak site 2527 is a second length, and the length from the third end 2528*a* of the fourth score groove 2528 to the second weak site 2526 is a third length; and the third length is smaller than the first length and the second length.

The first end 2521*a* is one end of the first score groove 2521 in its extending direction, the second end 2523*a* is one end of the third score groove 2523 in its extending direction, and the third end 2528*a* is one end of the fourth score groove 2528 in the extending direction.

In an embodiment in which the first score groove 2521, the second score groove 2522 and the third score groove 2523 jointly define one pressure relief portion 2524, for example, the first score groove 2521, the second score groove 2522 and the third score groove 2523 form an approximately "right open box"-shaped structure. One end of the first score groove 2521 away from the second score groove 2522 is the first end 2521*a*, and one end of the third score groove 2523 away from the second score groove 2522 is the second end 2523*a*. As shown in FIG. 7, in an embodiment in which the first score groove 2521, the second score groove 2522 and the third score groove 2523 jointly define two pressure relief portions 2524, for example, the first score groove 2521, the second score groove 2522 and the third score groove 2523 form an approximately "H"-shaped structure, both ends of the first score groove 2521 in the extending direction may be the first end 2521*a*, and both ends of the third score groove 2523 in the extending direction may be the second end 2523*a*.

In this embodiment, the third length is smaller than the first length and the second length, so that even if the pressure relief body 251 cracks along the fourth score groove 2528, a long crack will not be formed. The situation does not tend to occur where the pressure relief body 251 cracks too further along the fourth score groove 2528, causing that the pressure relief body 251 does not crack along the first score groove 2521 or the third score groove 2523. This facilitates the splitting of the pressure relief portion 2524 along the first score groove 2521 and the third score groove 2523.

Exemplarily, the first length is the same as the second length. That is to say, the lengths of the first score groove 2521 and the third score groove 2523 at the same side of the second score groove 2522 are the same, and the pressure relief portion 2524 splits in the same length at the positions of the first score groove 2521 and the third score groove 2523.

In some embodiments, referring to FIG. 7, the first weak site 2525 is located at the midpoint of the first score groove 2521, the second weak site 2526 is located at the midpoint of the fourth score groove 2528, and the third weak site 2527 is located at the midpoint of the third score groove 2523. The length of the fourth score groove 2528 is smaller than the length of the first score groove 2521 and the length of the third score groove 2523.

The first weak site 2525 is located at the midpoint of the first score groove 2521, that is, the second score groove 2522 divides the first score groove 2521 into two portions of the same length. The second weak site 2526 is located at the midpoint of the fourth score groove 2528, that is, the second score groove 2522 divides the fourth score groove 2528 into two portions of the same length. The third weak site 2527 is located at the midpoint of the third score groove 2523, that is, the second score groove 2522 divides the third score groove 2523 into two portions of the same length.

Since the first weak site 2525, the second weak site 2526 and the third weak site 2527 are respectively located at the midpoints of the first score groove 2521, the fourth score groove 2528 and the third score groove 2523, the pressure relief body 251 is formed with two pressure relief portions 2524 at two sides of the second score groove 2522. During the pressure relief process, the two pressure relief portions 2524 can be quickly split opposing each other, and the magnitudes of splitting of the two pressure relief portions 2524 are basically the same. In addition, the length of the fourth score groove 2528 is smaller than the length of the first score groove 2521 and the length of the third score groove 2523, which facilitates the splitting of the pressure relief portion 2524 along the first score groove 2521 and the third score groove 2523. Furthermore, the relatively short length of the fourth score groove 2528 can reduce the production cost.

In some embodiments, the length of the first score groove 2521 is the same as the length of third score groove 2523. In the splitting of the pressure relief portion 2524, this facilitates the complete cracking of the pressure relief body 251 along the first score groove 2521 and the third score groove 2523.

In some embodiments, the fourth score groove 2528 is arranged to intersect with and be perpendicular to the second score groove 2522.

The fourth score groove 2528 intersecting with the second score groove 2522 means that both ends of the fourth score groove 2528 extend to the second score groove 2522, and located at two sides of the second score groove 2522 in the width direction, and both ends of the second score groove 2522 extend the fourth score groove 2528 and located at two sides of the fourth score groove 2528 in the width direction. For example, the fourth score groove 2528 and the second score groove 2522 form an approximately "cross"-shaped structure.

In this embodiment, both ends of the fourth score groove 2528 in the extending direction thereof may be the third end 2528*a*.

In this embodiment, since the fourth score groove 2528 is arranged to intersect with and be perpendicular to the second score groove 2522, the stress at the intersection of the fourth score groove 2528 and the second score groove 2522 is more concentrated, whereby the pressure relief body 251 is more prone to breakage at the second weak site 2526.

In some embodiments, the wall thickness of the pressure relief body 251 at the first weak site 2525 and the wall thickness of the pressure relief body 251 at the third weak site 2527 are both greater than wall thickness of the pressure relief body 251 at the second weak site 2526.

For example, the first score groove 2521 and the second score groove 2522 intersect to form the first weak site 2525, the wall thickness of the pressure relief body 251 at the first weak site 2525 means the thickness of the remaining portion at the first weak site 2525 after the pressure relief body 251 is provided with the first score groove 2521 and the second score groove 2522. For example, the fourth score groove 2528 and the second score groove 2522 intersect to form the second weak site 2526, the wall thickness of the pressure relief body 251 is at the second weak site 2526 means the thickness of the remaining portion at the second weak site 2526 after the pressure relief body 251 is provided with the fourth score groove 2528 and the second score groove 2522. For example, the second score groove 2522 and the third score groove 2523 intersect to form the third weak site 2527, the wall thickness of the pressure relief body 251 at the third weak site 2527 means the thickness of the remaining portion at the third weak site 2527 after the pressure relief body 251 is provided with the second score groove 2522 and the third score groove 2523.

By defining the depth of the first score groove 2521, the depth of the second score groove 2522, and the depth of the third score groove 2523 to be smaller than the depth of the fourth score groove 2528, the wall thickness of the pressure relief body 251 at the first weak site 2525 and the wall thickness of the pressure relief body 251 at the third weak site 2527 are both greater than the wall thickness of the pressure relief body 251 at the second weak site 2526. By defining the depth of the first score groove 2521 and the depth of the third score grooves 2523 to be smaller than the depth of the second score groove 2522 and the depth of the second score groove 2522 to be the same as the depth of the fourth score groove 2528, the wall thickness of the pressure relief body 251 at the first weak site 2525 and the wall thickness of the pressure relief body 251 at the third weak site 2527 are both greater than the wall thickness of the pressure relief body 251 at the second weak site 2526. It is also possible to arrange the first score groove 2521 as a gradient groove with varying depth, such that the depth of the second score groove 2522 gradually decreases from the position of the second weak site 2526 toward both ends, so as to achieve a wall thickness of the pressure relief body 251 at the first weak site 2525 and a wall thickness of the pressure relief body 251 at the third weak site 2527 that are greater than the wall thicknesses of the pressure relief body 251 at the second weak site 2526.

In this embodiment, the wall thickness of the pressure relief body 251 at the first weak site 2525 and the wall thickness at the third weak site 2527 are greater than the wall thickness at the second weak site 2526, that is, the wall thickness of the pressure relief body 251 at the second weak site 2526 is thinner. As such, the pressure relief body 251 is more prone to breakage at the second weak site 2526 than at the first weak site 2525 and the third weak site 2527. This ensures that during the pressure relief process, the pressure relief body 251 cracks from the second weak site 2526 toward the first weak site 2525 and the third weak site 2527 at two sides along the second score groove 2522.

In some embodiments, in the extending direction of the second score groove 2522, the second score groove 2522 has opposing fourth end 2522*a* and fifth end 2522*b*. The first score groove 2521 is closer to the fourth end 2522*a* than the third score groove 2523, and the third score groove 2523 is closer to the fifth end 2522*b* than the first score groove 2521. The fourth end 2522*a* is beyond the first score groove 2521 in a direction in which the first score groove 2521 faces away from the third score groove 2523; and/or the fifth end 2522*b* is beyond the third score groove 2523 in a direction in which the third score groove 2523 faces away from the first score groove 2521.

If the fourth end 2522*a* is beyond the first score groove 2521 in a direction in which the first score groove 2521 faces away from the third score groove 2523, and the fifth end 2522*b* is beyond the third score groove 2523 in a direction in which the third score groove 2523 faces away from the first score groove 2521, that is, the two ends of the second score groove 2522 are beyond the first score groove 2521 and the third score groove 2523, respectively, it can be understood that the second score groove 2522 is arranged to intersect with the first score groove 2521, and the second score groove 2522 is arranged to intersect with the third score groove 2523.

The fourth end 2522*a* of the second score groove 2522 is beyond the first score groove 2521 in a direction in which the first score groove away 2521 faces away from the third score groove 2523, which is beneficial to the formation of the first weak site 2525 at the intersection of the first score groove 2521 and the second score groove 2522. Therefore, the pressure relief body 251 can easily split along the first score groove 2521 with the first weak site 2525 as a starting point after splitting along the second score groove 2522. The fifth end 2522*b* of the second score groove 2522 is beyond the third score groove 2523 in a direction in which the third score groove 2523 faces away from the first score groove 2521, which is beneficial to the formation of the third weak site 2527 at the intersection of the third score groove 2523 and the second score groove 2522. Therefore, the pressure relief body 251 can easily split along the third score groove 2523 with the third weak site 2527 as a starting point after splitting along the second score groove 2522.

Figure 8:
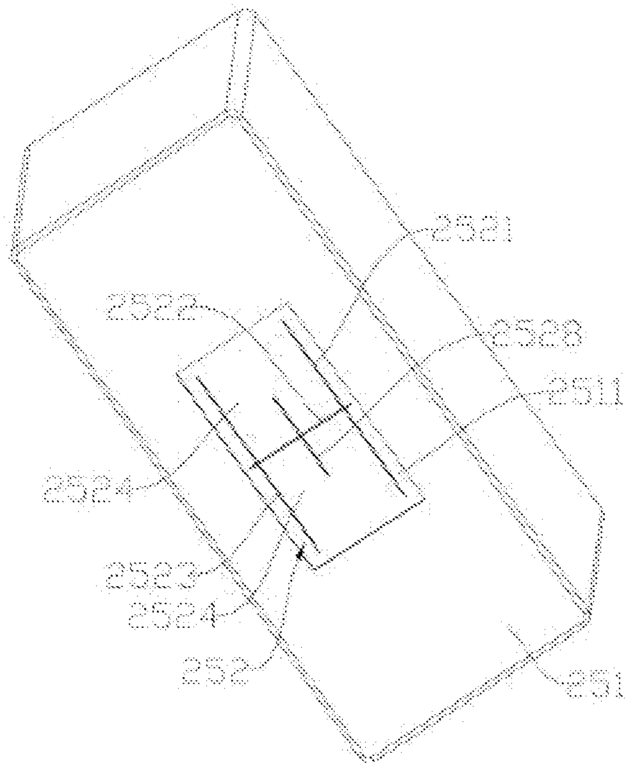
FIG. 8 is a schematic structural view of a pressure relief device provided in some embodiments of the present application.

In some embodiments, referring to FIG. 8, which is a schematic structural view of a pressure relief device 25 according to some embodiments of the present application. The pressure relief body 251 is provided with a concave portion 2511, and the pressure relief structure 252 is provided at the bottom of the concave portion 2511.

A bottom surface of the concave portion 2511 is a surface where the concave portion 2511 is connected to a side surface thereof. For example, the concave portion 2511 is a rectangle. The concave portion 2511 has four side surfaces, and the four side surfaces are peripherally arranged at the edge of the bottom surface.

The concave portion 2511 is a structure recessed from the surface of the pressure relief body 251 to the interior of the pressure relief body 251. The pressure relief structure 252 is provided on the bottom surface of the concave portion 2511, that is, all the score grooves in the pressure relief structure 252 are provided on the bottom surface of the concave portion 2511. In an embodiment in which the pressure relief structure 252 includes the first score groove 2521, the second score groove 2522 and the third score groove 2523, the first score groove 2521, the second score groove 2522 and the third score groove 2523 are arranged on the bottom surface of the concave portion. In an embodiment in which the pressure relief structure 252 includes the first score groove 2521, the second score groove 2522, the third score groove 2523, and the fourth score groove 2528, the first score groove 2521, the second score groove 2522, the third score groove 2523, and the fourth score groove 2528 are arranged on the bottom surface of the concave portion.

During the forming process, the concave portion 2511 may be machined on the pressure relief body 251 first, and then each score groove may be machined on the bottom surface of the concave portion 2511.

The concave portion 2511 may be of various shapes, such as a rectangle, a circle, and the like. In FIG. 8, the concave portion 2511 is a rectangle.

In this embodiment, the pressure relief structure 252 is located at the bottom surface of the concave portion 2511, and the depth of each score groove in the pressure relief structure 252 does not need to be processed too deep, thereby reducing the difficulty of forming each score groove.

Referring to FIG. 8, in some embodiments, an accommodating cavity for accommodating the electrode assembly 22 is formed inside the pressure relief body 251. The pressure relief body 251 has a plurality of walls defining the accommodating cavity, and at least one wall is with the pressure relief structure 252.

At least one wall of the pressure relief body 251 is provided with the pressure relief structure 252, and only one wall is provided with the pressure relief structure 252, or multiple walls are provided with the pressure relief structure 252. The pressure relief structure 252 may be provided on the outer surface of the wall, or provided on the inner surface of the wall.

The pressure relief body 251 may be of various shapes, such as a cylinder, a cuboid, or the like. For example, the pressure relief body 251 is a rectangular parallelepiped. The pressure relief body 251 may have five walls, including a bottom wall and four side walls together defining an accommodating cavity with open one end, and the pressure relief structure 252 is provided on the bottom wall. For example, the pressure relief body 251 is a cylinder. The pressure relief body 251 may have two walls, including a bottom wall and a peripheral wall circumferentially arranged on the edge of the bottom wall. The peripheral wall and the bottom wall together define an accommodating cavity with one open end, and the pressure relief structure 252 is provided on the bottom wall.

In this embodiment, an accommodating cavity for accommodating the electrode assembly 22 is formed inside the pressure relief body 251, and the pressure relief body 251 has a plurality of walls defining the accommodating cavity. As a result, the pressure relief device 25 is a case 21 capable of accommodating the electrode assembly 22, and the pressure relief device 25 has integrated accommodating and pressure relief functions.

In some embodiments, the pressure relief structure 252 is provided on the outer surface of the wall to facilitate the machining of various score groove in the pressure relief structure 252.

In some embodiments, referring to FIG. 8, when the pressure relief body 251 is provided with a concave portion 2511 and the pressure relief structure 252 is arranged on the bottom surface of the concave portion 2511, the concave portion 2511 is provided on the wall of the pressure relief body 251 and recessed from the outer surface of the wall toward the inner surface.

The inner surface of the wall is the surface of the wall facing the electrode assembly 22, and the outer surface of the wall is the surface of the wall facing away from the electrode assembly 22.

The pressure relief structure 252 is located at the bottom surface of the concave portion 2511, and the depth of each score groove in the pressure relief structure 252 does not need to be processed too deep, thereby reducing the difficulty of forming each score groove. In addition, since the concave portion 2511 is recessed inward from the outer surface of the wall, the concave portion 2511 can provide an avoidance space for the pressure relief portion 2524, so that the pressure relief portion 2524 is at least partially accommodated in the concave portion 2511 after splitting, thus reducing the space outside the outer surface of the wall occupied by the pressure relief portion 2524 after splitting.

An embodiment of the present application provides a battery cell 20, including a pressure relief device 25 provided in any one of the foregoing embodiments.

An embodiment of the present application provides a battery 100, which includes a box body 10 and a battery cell 20 provided in any of the above embodiments, where the box body 10 is configured to accommodate the battery cell 20.

An embodiment of the present application provides an electrical device, including a battery 100 provided in any one of above-mentioned embodiments.

The electrical device can be any of the aforementioned apparatuses that use the battery 100.

Referring to FIG. 6, an embodiment of the present application further provides a case for accommodating the electrode assembly 22. The case is provided with a pressure relief structure 252, and the pressure relief structure 252 includes a first score groove 2521, a second score groove 2522, a third score groove 2523 and a fourth score groove 2528 provided on the case. The first score groove 2521 and the third score groove 2523 are arranged at an interval, and the fourth score groove 2528 is located between the first score groove 2521 and the third score groove 2523. The first score groove 2521, the third score groove 2523 and the fourth score groove 2528 all intersect with the second score groove 2522. The first score groove 2521, the second score groove 2522 and the third score groove 2523 jointly define the pressure relief portion 2524. The pressure relief portion 2524 is configured to split with the first score groove 2521, the second score groove 2522, and the third score groove 2523 as boundaries when the pressure or temperature inside the battery cell 20 reaches a threshold, to relieve the pressure inside the battery cell 20. The case of this structure has a larger pressure relief area, which increases the pressure relief rate, reduces the risk of fire and explosion of the battery cell 20 due to thermal runaway, and improves the safety of the battery cell 20.

Figure 9:
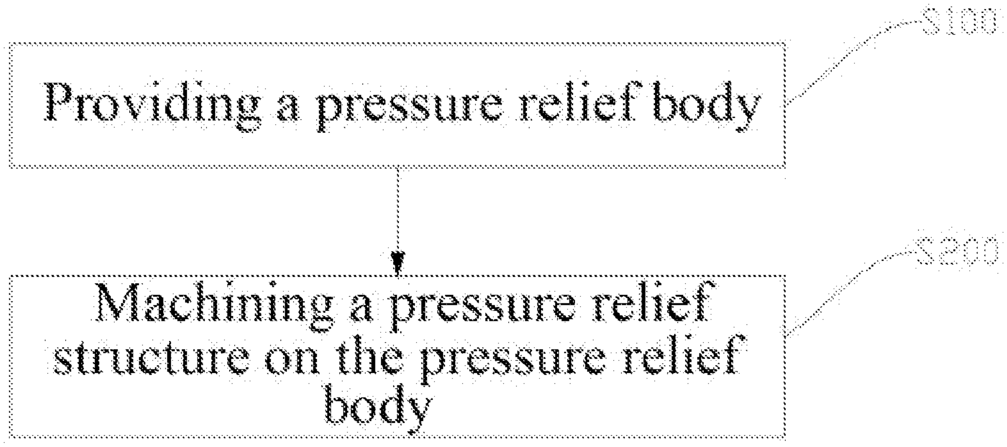
FIG. 9 is a flow chart of a method for manufacturing a pressure relief device provided in some embodiments of the present application.

An embodiment of the present application provides a method for manufacturing a pressure relief device 25. FIG. 9 is a flow chart of a method for manufacturing the pressure relief device 25 provided in some embodiments of the present application. Referring to FIG. 9. the method includes:

S100: Providing a pressure relief body 251.

S200: Machining a pressure relief structure 252 on the pressure relief body 251.

The pressure relief structure 252 includes a first score groove 2521, a second score groove 2522, and a third score groove 2523 provided on the pressure relief body 251. The first score groove 2521 and the third score groove 2523 are arranged at an interval, and the first score groove 2521 and the third score groove 2523 both intersect with the second score groove 2522. The first score groove 2521, the second score groove 2522 and the third score groove 2523 jointly define the pressure relief portion 2524. The pressure relief portion 2524 is configured to split with the first score groove 2521, the second score groove 2522, and the third score groove 2523 as boundaries when the pressure or temperature inside the battery cell 20 reaches a threshold, to relieve the pressure inside the battery cell 20.

In some embodiments, the pressure relief structure 252 further includes a fourth score groove 2528 provided on the pressure relief body 251, and the fourth score groove 2528 is located between the first score groove 2521 and the third score groove 2523. The first score groove 2521, the second score groove 2522, the third score groove 2523 and the fourth score groove 2528 are formed on the pressure relief body 251 by punching.

It should be noted that for the relevant structure of the pressure relief device 25 manufactured by the manufacturing methods provided in the above embodiments, reference may be made to the pressure relief device 25 provided in the foregoing embodiments, which will not be repeated here.

Figure 10:
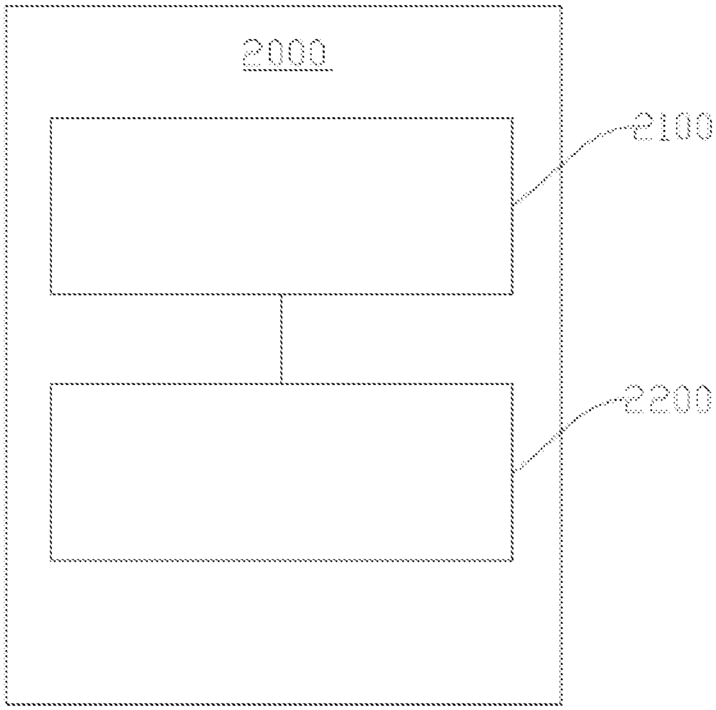
FIG. 10 is a schematic block diagram of an apparatus for manufacturing a pressure relief device provided in some embodiments of the present application.

In addition, an embodiment of the present application also provides a manufacturing apparatus 2000 of the pressure relief device 25. FIG. 10 is a schematic block diagram of the manufacturing apparatus 2000 of the pressure relief device 25 provided in some embodiments of the present application. Referring to FIG. 10, the manufacturing apparatus 2000 includes a providing means 2100 and a machining means 2200. The providing means 2100 is configured to provide a pressure relief body 251, and the machining means 2200 is used to machine a pressure relief structure 252 on the pressure relief body 251.

The pressure relief structure 252 includes a first score groove 2521, a second score groove 2522, and a third score groove 2523 provided on the pressure relief body 251. The first score groove 2521 and the third score groove 2523 are arranged at an interval, and the first score groove 2521 and the third score groove 2523 both intersect with the second score groove 2522. The first score groove 2521, the second score groove 2522 and the third score groove 2523 jointly define the pressure relief portion 2524. The pressure relief portion 2524 is configured to split with the first score groove 2521, the second score groove 2522, and the third score groove 2523 as boundaries when the pressure or temperature inside the battery cell 20 reaches a threshold, to relieve the pressure inside the battery cell 20.

It should be noted that for the relevant structure of the pressure relief device 25 manufactured by the manufacturing apparatus 2000 provided in the above embodiments, reference may be made to the pressure relief device 25 provided in the foregoing embodiments, which will not be repeated here.

It should be noted that in case of no conflicts, the features of the embodiments in the present application can be combined with each other.

The above embodiments are merely illustrative of the technical solutions of the present application, and not intended to limit the present application. For those skilled in the art, the present application may have various modifications and changes. Any modifications, equivalent replacements, and improvements, etc. made without departing from the spirit and principle of the present application shall be included within the scope of protection of the present application.

What is claimed is:

1. A pressure relief device for a battery cell, comprising: a pressure relief body; and a pressure relief structure, comprising a first score groove, a second score groove and a third score groove provided on the pressure relief body, wherein:

the first score groove and the third score groove are each a linear groove extending in a straight line and arranged at an interval, the first score groove and the third score groove both intersect with the second score groove, which is also a linear groove extending in a straight line, and the first score groove, the second score groove and the third score groove jointly define two pressure relief portions; and the two pressure relief portions are divided by the second score groove, wherein the second score groove forms an axis of symmetry of the two pressure relief portions and each pressure relief portion is defined between three sides extending each in a straight line; wherein the pressure relief portions are configured to split with the first score groove, the second score groove and the third score groove as boundaries when the pressure or temperature inside the battery cell reaches a threshold, so as to relieve the pressure inside the battery cell;

wherein the second score groove has a first weak site, a second weak site and a third weak site, wherein the second score groove intersects with the first score groove at the first weak site, the second score groove intersects the third score groove at the third weak site, and in the extending direction of the second score groove, the second weak site is located between the first weak site and the third weak site; and the pressure relief body is configured to, when the pressure or temperature inside the battery cell reaches a threshold, crack from the second weak site toward the first weak site and the third weak site along the second score groove to form a first crack, so that the pressure relief portions are split along the first score groove and the third score groove after the pressure relief body is formed with the first crack;

wherein the pressure relief structure further comprises a fourth score groove provided on the pressure relief body, and the fourth score groove intersects with the second score groove at the second weak site;

wherein the first score groove has a first end, the third score groove has a second end, and the fourth score groove has a third end, wherein in a width direction of the second score groove, the first end, the second end and the third end are located at the same side of the second score groove; and a length from the first end of the first score groove to the first weak site is a first length, a length from the second end of the third score groove to the third weak site is a second length, and a length from the third end of the fourth score groove to the second weak site is a third length, wherein the third length is smaller than the first length and the second length.

2. The pressure relief device according to claim 1, wherein a depth of the first score groove, a depth of the second score groove, and a depth of the third score groove are all less than a depth of the fourth score groove.

3. The pressure relief device according to claim 2, wherein the depth of the first score groove and the depth of the third score groove are the same as the depth of the second score groove.

4. The pressure relief device according to claim 1, wherein a depth of the first score groove and a depth of the third score groove are less than a depth of the second score groove, and the depth of the second score groove is the same as a depth of the fourth score groove.

5. The pressure relief device according to claim 4, wherein the depth of the first score groove is the same as the depth of the third score groove.

6. The pressure relief device according to claim 1, wherein the first length is the same as the second length.

7. The pressure relief device according to claim 1, wherein the first weak site is located at a midpoint of the first score groove, the second weak site is located at a midpoint of the fourth score groove, and the third weak site is located at a midpoint of the third score groove; and a length of the fourth score groove is smaller than a length of the first score groove and a length of the third score groove.

8. The pressure relief device according to claim 7, wherein the length of the first score groove is the same as the length of the third score groove.

9. The pressure relief device according to claim 1, wherein the fourth score groove is arranged to cross with and be perpendicular to the second score groove.

10. The pressure relief device according to claim 1, wherein a wall thickness of the pressure relief body at the first weak site and a wall thickness of the pressure relief body at the third weak site are both greater than a wall thickness of the pressure relief body at the second weak site.

11. The pressure relief device according to claim 1, wherein in the extending direction of the second score groove, the second score groove has opposing fourth end and fifth end, wherein the first score groove is closer to the fourth end than the third score groove, and the third score groove is closer to the fifth end than the first score groove; and the fourth end is beyond the first score groove in a direction in which the first score groove faces away from the third score groove; and/or the fifth end is beyond the third score groove in a direction in which the third score groove faces away from the first score groove.

12. The pressure relief device according to claim 1, wherein the pressure relief body is provided with a concave portion, and the pressure relief structure is located at a bottom surface of the concave portion.

13. The pressure relief device according to claim 1, wherein an accommodating cavity for accommodating an electrode assembly is formed inside the pressure relief body, the pressure relief body has a plurality of walls defining the accommodating cavity, and at least one wall is provided with the pressure relief structure.

14. The pressure relief device according to claim 13, wherein the pressure relief structure is provided on an outer surface of the wall.

15. The pressure relief device according to claim 13, wherein the wall is provided with a concave portion recessed from an outer surface of the wall to an inner surface, and the pressure relief structure is provided on a bottom surface of the concave portion.

* * * * *